United States Patent [19]

Lynde et al.

[11] Patent Number: 5,014,778

[45] Date of Patent: * May 14, 1991

[54] MILLING TOOL FOR CUTTING WELL CASING

[75] Inventors: Gerald D. Lynde, Bossier City; Kenneth W. Winterrowd, Shreveport; Harold H. Harvey, Jr., Bossier City, all of La.

[73] Assignee: Tri-State Oil Tools, Inc., Bossier City, La.

[*] Notice: The portion of the term of this patent subsequent to Jan. 10, 2006 has been disclaimed.

[21] Appl. No.: 169,836

[22] Filed: Mar. 18, 1988

Related U.S. Application Data

[63] Continuation of Ser. No. 816,287, Jan. 6, 1986, Pat. No. 4,796,709.

[51] Int. Cl.$^5$ ............................................. E21B 29/00
[52] U.S. Cl. .................................... 166/55.6; 408/80; 408/144
[58] Field of Search ........................... 166/55.6, 55.7; 408/79-82, 111, 144, 145, 213, 227, 229; 144/205; 407/32, 118, 119, 2, 6, 62, 66, 100, 116; 175/374, 375; 82/4 C; 76/108 A, 108 J, DIG. 11

[56] References Cited

U.S. PATENT DOCUMENTS

| | | |
|---|---|---|
| 2,328,494 | 5/1942 | Reaney . |
| 2,337,322 | 12/1943 | Gascoigne . |
| 2,709,490 | 5/1955 | Trimble . |
| 2,846,193 | 8/1958 | Chadderdon . |
| 2,999,541 | 9/1961 | Kinzbach et al. . |
| 3,110,084 | 11/1984 | Kinzbach . |
| 3,114,416 | 12/1963 | Kammerer . |
| 3,145,790 | 8/1964 | Bridwell et al. . |
| 3,147,536 | 9/1964 | Lamphere et al. . |
| 4,452,325 | 6/1984 | Radd et al. . |
| 4,459,883 | 6/1984 | Astle . |
| 4,499,795 | 2/1985 | Radtke ........................ 76/DIG. 11 |
| 4,710,074 | 12/1987 | Springer ............................. 408/200 |
| 4,796,709 | 1/1989 | Lynde et al. ...................... 166/55.6 |

FOREIGN PATENT DOCUMENTS 156235 3/1984 European Pat. Off. .
869975 10/1981 U.S.S.R. .

OTHER PUBLICATIONS

Sheet entitled "Cutting Edge Geometrics" from Sandvik. .
Brochure entitled "Turning Tools and Inserts" (1984) pp. 75 and 76 of Kennametal Brochure entitled Kennametal Milling/87.
'84-85"Composite Catalog of Oil Field Tools & Services" pp. 6707, 7213.
Advertising Circular for "Lockomatic" Expanding Hole Opener.
Memo of Goods Delivered, Tri-State Oil Tool Industries, Inc. dated Aug. 22, 1980, Job No. 389470.
Shop Requisition No. 66192 dated Aug. 18, 1980, Tri-State Oil Tool Industries, Inc.
Supervisor's Job Resume, Job No. 387770 dated Aug. 22, 1980, Tri-State Oil Tool Industries, Inc.
Invoice No. 3-308259 dated Nov. 22, 1980 to Amoco Production Company.

(List continued on next page.)

Primary Examiner—Z. R. Bilinsky
Attorney, Agent, or Firm—Dodge, Bush & Moseley

[57] ABSTRACT

An oil field cutting tool (10) for progressively cutting away a tubular member (14) installed within a well from the upper annular end (12) of the tubular member (14). The cutting tool (10) includes a plurality of elongate blades (32) spaced about the periphery of the cylindrical body (18) of the cutting tool (10). A plurality of cutting elements (42) of a predetermined size and shape are secured in a predetermined pattern on the leading surface of the blades (32) in a plurality of closely spaced parallel rows extending transversely between the sides of the blades (32) and in a plurality of closely spaced parallel columns extending generally longitudinally between the ends of the blades (32).

36 Claims, 3 Drawing Sheets

OTHER PUBLICATIONS

Part No. SK-5065-09 dated Aug. 16, 1980 for Knife Insert 10-3/4 Model "T" Section Mill.
Part No. SK-5065-09A dated Aug. 18, 1980 for Detail F/Knife Insert 10-3/4 Model "T" Section Mill.
Engineering Record File of Tri-State Showing Engineering Change Notice For Sketch No. SK-5065-009.
Letters dated Mar. 13, 1989 and Mar. 20, 1989 from Forrester Ketley & Co. to UK Patent Office re UK appl. s/n 8614488.
Affidavit of Robert Short and Exhibits RS1, RS2, and RS3.
Affidavit of Kenneth Kirk and Exhibits KVK01, KVK02, and KVK03.
Affidavit of George Morris and Exhibits GHOM1, GHOM2, GHOM3, GHOM4, and GHOM5.
Affidavit of Franciscus Roemer and Exhibits FRO1, FRO2, FRO3, FRO4, and FRO5.

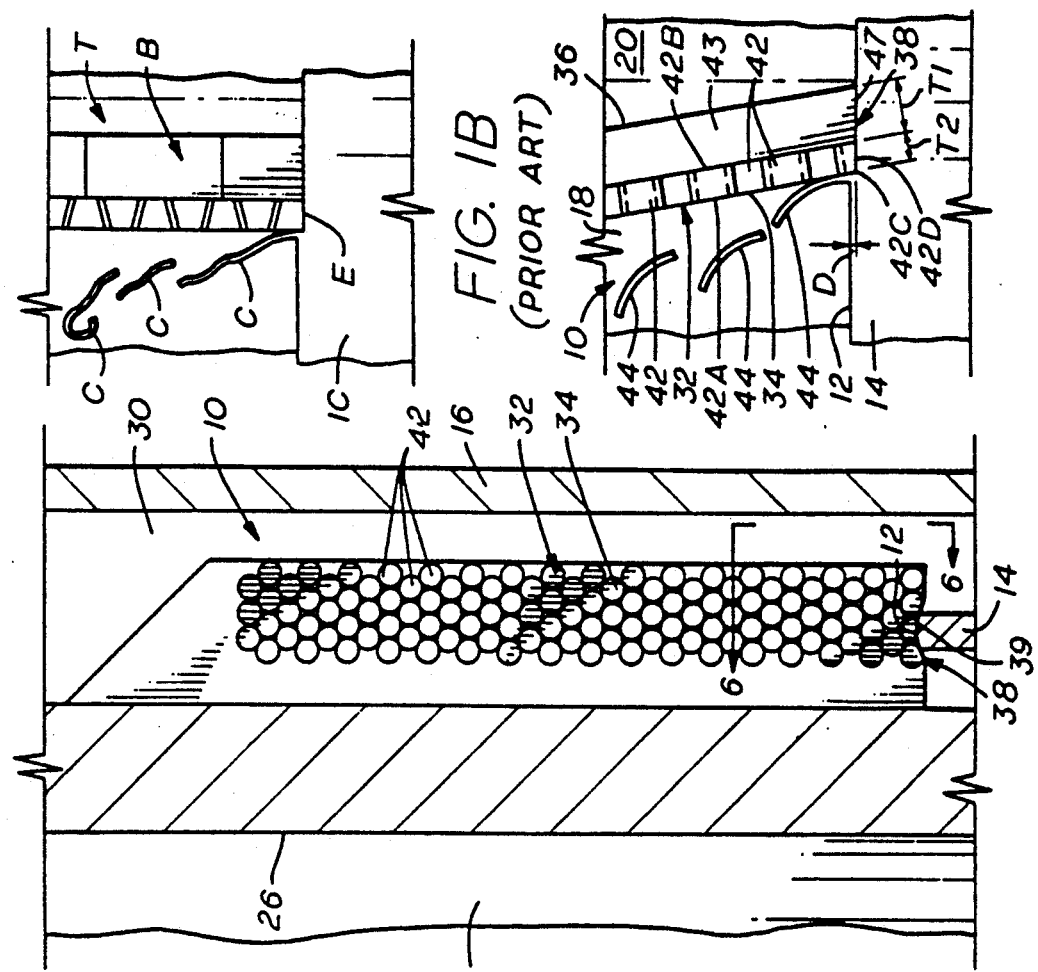
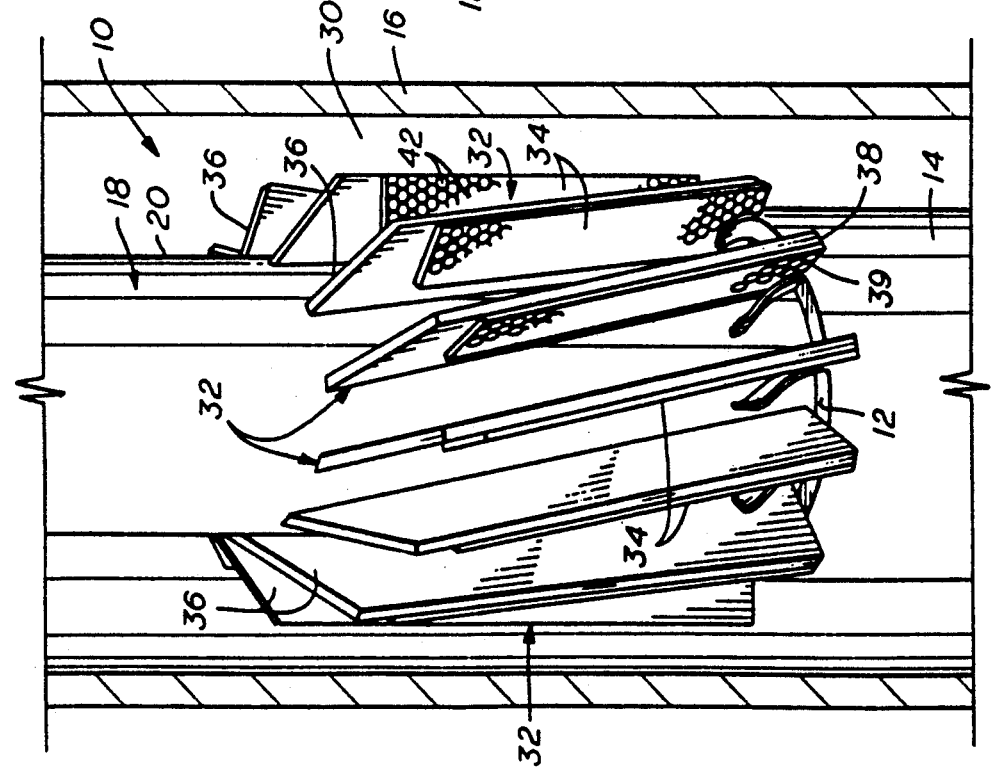
FIG. 1B (PRIOR ART)
FIG. 6
FIG. 5
FIG. 4

MILLING TOOL FOR CUTTING WELL CASING

This application is a continuation of application Ser. No. 816,287, filed Jan. 6, 1986, U.S. Pat. No. 4,796,709.

BACKGROUND OF THE INVENTION

This invention relates generally to a cutting tool for cutting tubular members, such as pipe, casing, casing liners, or tubing, previously installed within a well, and more particularly, to such a milling or cutting tool which is inserted within a well for removing a predetermined length or section of a tubular member from the well.

Heretofore, various types of milling or cutting tools have been provided for cutting or milling existing pipe or casing previously installed in a well. Such tools normally have cutting blades on their lower ends and are lowered within the well or casing to be cut and then rotated in a cutting operation. A suitable drilling fluid is normally pumped down a central bore of the cutting tool for discharge beneath the cutting blades and an upward flow of the discharged fluid in the annulus outside the cutting tool removes the cuttings or chips resulting from the cutting operation from the well.

Milling tools for removing a section of existing casing or the like from a well bore have been provided heretofore. Sections of casings are removed for various purposes, such as, for example, to permit a sidetracking operation in directional drilling, to provide a perforated production zone at a desired level, to provide cement bonding between a small diameter casing and the adjacent formation, or to remove a loose joint of surface pipe. Also, milling tools are used for milling or reaming collapsed casing, for removing burrs or other imperfections from windows in the casing system, for placing whipstocks in directional drilling, or for aiding in correcting dented or mashed-in areas of casing or the like.

A common milling tool has a plurality of blades spaced about the outer surface of the tool with the lower surfaces of the blades engaging the upper circular end surface of the pipe or casing in a cutting operation to chip or cut away progressively the end of the casing. Each blade takes a bite or cut from the upper end of the casing during rotation of the milling tool. The rate of penetration or cutting away of the casing is normally dependent on several factors, such as, for example, the rotational speed of the tool, the amount of weight on the tool, the number and type of blades, and the rate at which the chips or cuttings are removed from the well. Normal penetration rates heretofore have been around eight (8) to eleven (11) feet per hour and blades have required replacement after removal of around one hundred feet of casing. Also, long turnings over around six inches in length that tend to curl and internest with each other have been provided heretofore.

A critical factor in obtaining a high rate of penetration is in the removal of the metal scrap material and oftentimes the limiting factor to the cutting operation is the rate of removal of the metal scrap material. Long turnings or shavings tend to restrict, at times, such removal rates.

SUMMARY OF THE PRESENT INVENTION

The present invention is particularly directed to a cutting tool adapted to be lowered within an outer well casing for cutting, grinding, or chipping a section or length of an existing casing previously installed in the well. As used in the specification and claims herein, the term "casing" shall be interpreted to include pipe, casing, tubing, liners, and other similar tubular members installed within a well.

The milling tool of the present invention comprises a plurality of improved cutting blades closely spaced from each other between around one inch and three inches about the outer periphery of a generally cylindrical tool body. Each blade is generally identical and has an elongate leading planar surface inclined rearwardly from its upper end with respect to the axis of rotation and a lower cutting surface in cutting contact with and biting into the upper circular end of the casing to be removed. The inclination of the leading planar surface results in a dragging or pulling of the lower cutting edge across the upper annular end surface of the casing being cut away to provide an improved smooth cutting action which also results in the formation of relatively short length turnings or chips having a length less than six inches thereby to permit the easy removal of the scrap metal from the well by drilling fluid.

The leading surface of each blade is defined by a plurality of metal carbide cutting elements secured to the base of the blade, and in the embodiment shown includes a plurality of metal carbide cylindrical discs arranged in adjacent generally horizontal rows, each row having at least two carbide discs therein and being staggered with respect to adjacent rows. The hard carbide discs are secured such as by brazing to the base or body of the blade and form the lower cutting edge which digs or bites into the upper end of the casing to be removed. The carbide cutting elements and the supporting base of the blade wear away from the lower end of the blade as the cutting operation continues. The thickness of the blade body supporting the carbide cutting elements is around twice the thickness of the discs and is formed of a mild steel material preferably around seven times softer than the metal carbide discs so that any drag from the wear flat formed by the blade body contacting the upper end of the casing is minimized.

The lower cutting surface of the blade has a so-called negative rake formed by the rearward inclination of the leading face of the blade with respect to the axis of rotation and this results in a pulling or dragging of the cutting edge across the surface for the improved cutting action in combination with a maximum number of blades as can be accommodated while permitting the efficient and effective removal of the metal cuttings or turnings formed in the cutting action, and a depth of cut or bite taken by each blade of between around 0.002 inch to 0.005 inch to form a short length of metal cutting which restricts curling or rolling up and thereby is easy to remove from the well. It has been found that a surface speed of each blade along the uppermost end of the casing of an optimum of around three hundred to three hundred and fifty feet per minute provides the most effective cutting action with the present invention.

Insofar as the life of the blade is concerned, the blade length determines its life and with a twelve inch blade on which the carbide discs are secured, around two hundred feet of casing may be cut before the blades require replacement. Such a long life blade minimizes the number of trips for the milling tool required for replacement of blades. As noted above, it has been normal heretofore to obtain a penetration rate or cutting away of the casing within the well of around eight to eleven feet per hour. However, the present invention has had rates of penetration of from thirty to forty-five feet per hour which is three to four times greater than the rate of penetration heretofore. This has been obtained by the use of the novel blades comprising the present invention. For example, when using the milling tool of the present invention to remove an inner casing having an outside diameter of nine and 5/8ths inches with twelve blades positioned at intervals of thirty degrees (30°) about the circumference of the cylindrical tool body and operated at a surface speed of around three hundred and fifty feet per minute along the upper end surface of the casing with a bite of around 0.004 inch, a weight of around 12,000 pounds, and a torque of between 2,500 foot pounds and 3,000 foot pounds, a penetration rate of between thirty and forty feet in one hour was obtained. Such an increased rate of penetration has been unexpected and surprising as compared with the rates of penetration heretofore with somewhat similar types of milling tools as shown by the prior art.

It is an object of the present invention to provide a milling tool having improved cutting blades and adapted to be lowered within an outer well casing for cutting or milling away a section of an inner well casing at a high penetration rate, such as thirty feet an hour or more.

It is a further object of the present invention to provide such a milling tool having improved elongate blades with leading planar surfaces inclined rearwardly from their upper ends with respect to the axis of rotation to provide a lower cutting edge having a negative rake for digging or biting into the upper end of the casing as the cutting edge is pulled along such upper end.

An additional object is to provide such improved blades having a plurality of hard carbide cutting elements thereon defining the leading planar surfaces of the blades and the cutting edges, with the body of the blades on which the cutting elements are mounted being of a thickness of around twice the thickness of the cutting elements and formed of a material around seven times softer than the carbide cutting elements thereby to minimize frictional contact of the blades with the upper end of the casing.

Another object of this invention is to provide such a milling tool having a maximum number of blades equally spaced at intervals between one inch and three inches about the periphery of the tool with each blade taking a bite of between 0.002 and 0.005 inch from the end of the casing and providing relatively short length metal chips or turnings thereby to permit an effective removal of the metal scrap material from the well.

Other objects, features, and advantages of this invention will become more apparent after referring to the following specification and drawings.

FIG. 1B is an enlarged fragment of the prior art milling tool shown in FIG. 1A showing the cutting action resulting from a prior art blade in alignment with the axis of rotation;

FIG. 4 is a perspective of the milling tool of FIGS. 1-3 showing the lower cutting surface of the cutting blades biting into and engaging the upper annular end of the inner casing to strip or cut away in a plurality of a generally uniform size metal cuttings a predetermined section of casing;

FIG. 5 is an enlarged fragment of FIG. 1 illustrating one blade with hard carbide cutting elements secured to and forming the leading face thereof; and FIG. 6 is an enlarged side elevation of the blade looking generally along line 6—6 of FIG. 5 and showing the lower cutting edge of the blade engaging the upper end of the inner casing in a cutting operation.

Figures 1, 1A:
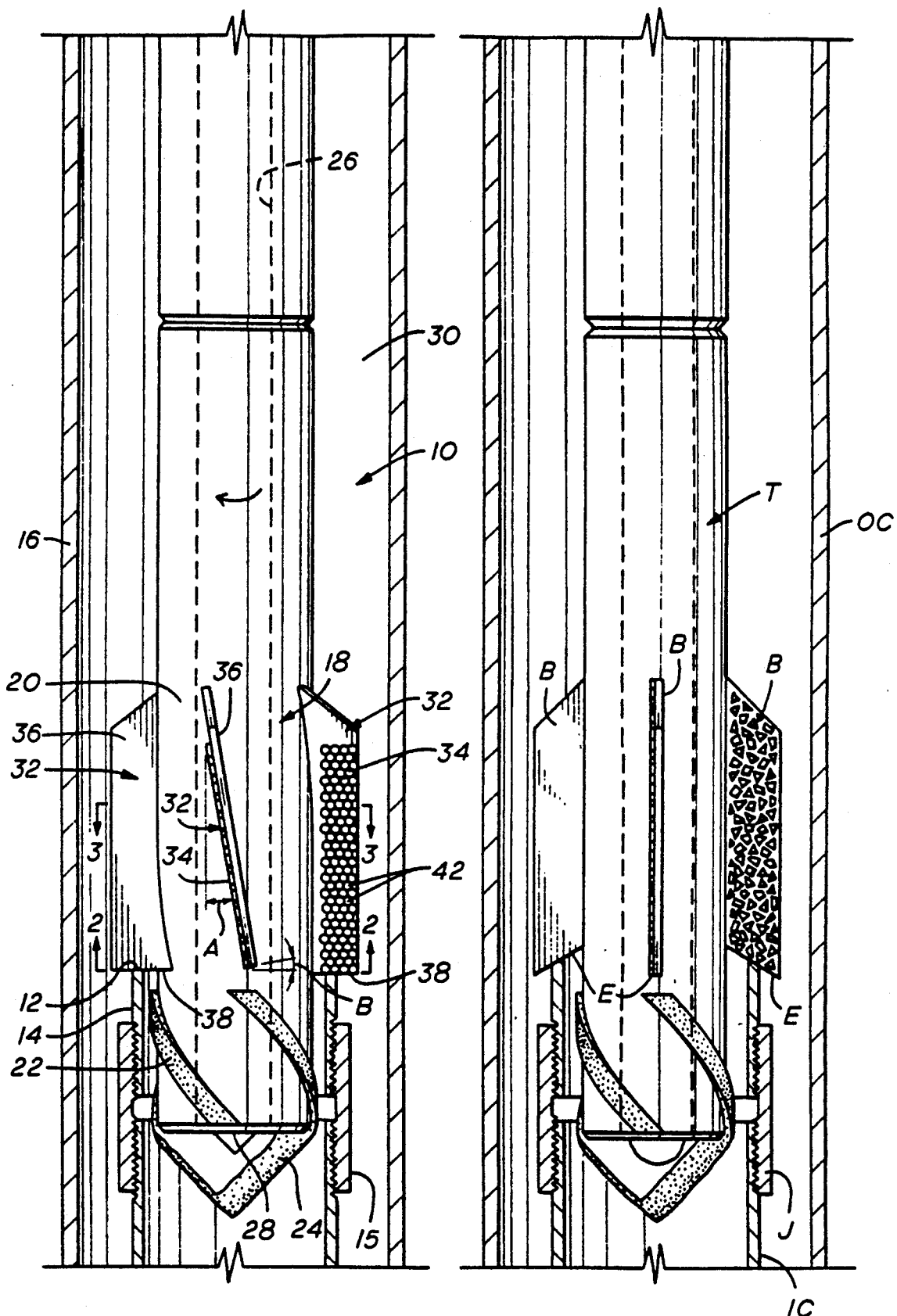
FIG. 1A is a longitudinal section of a prior art milling tool for progressively cutting away the upper end of an inner well casing for removing a predetermined section or length of casing from the well.
FIG. 1 is a longitudinal section of the present milling tool comprising the present invention having the improved blades thereon for cutting into the upper annular end of an inner casing installed within a well for removal of a section of the inner casing.

Referring now to the drawings for a better understanding of this invention, and more particularly to FIGS. 1A and 1B in which an example of a prior art milling tool T is illustrated, a plurality of blades B are spaced about the outer periphery of tool T. Blades B have lower cutting edges E for contacting and engaging in cutting relation the upper annular end of an inner casing IC installed within an outer casing OC of a well. Blades B progressively cut away a predetermined section of the inner casing including joints J between casing lengths which are normally around thirty feet.

Blades B are welded onto the outer periphery of the cylindrical body of milling tool T and extend in a vertical direction parallel to the longitudinal rotational axis of milling tool T. The front leading faces of blades B have carbide cutting chips secured thereon which provide a cutting surface and as shown in FIG. 1B the lower cutting edge E of blade B extends at a right angle to the front face of blade B and rides along the annular end surface of inner casing IC to provide a plurality of metal turnings or chips C in various shapes and sizes. The relatively wide variation in the sizing of the metal turnings or metal chips C may range from around 0.001 inch to 0.020 inch in thickness with a substantial amount of long length turnings over six inches as a result of the relatively rough rotary movement resulting from contact of the lower surfaces of blades B with the upper end of inner casing IC. With such a wide variation of metal chips or cuttings, particularly the long length curled or rolled up shavings, sometimes such metal shavings will intertwine or internest in a mass which will restrict the removal of the metal turnings by the drilling fluid being discharged from the lower end of milling tool T through a central bore.

With the use of prior art milling tool T as shown in FIGS. 1A and 1B having around eight blades for cutting away a casing section having an OD of nine and 5/8ths inches, a rate of penetration of around eight to eleven feet per hour was normal heretofore with the blades wearing away at the rate of around two inches for each ten to fifteen feet of casing section being removed.

Referring now to FIGS. 1-6 in which the present invention is illustrated, a milling tool comprising the present invention is illustrated generally at 10 and is adapted for cutting or milling away the annular end 12 of inner casing 14 and associated coupling 15 which are positioned within outer casing 16 of a well. Milling tool 10 is supported from the surface for rotation by suitable power means, as well known, which is also adapted to apply a predetermined loading on tool 10.

Milling tool 10 has a cylindrical lower body portion 18 forming a tool body which defines an outer peripheral surface 20. The lower end portion of body portion 18 forms a stabilizer and stabilizer ribs 22 thereon are spaced slightly from the inner peripheral surface of inner casing 14 for positioning milling tool 10 accurately within inner casing 14. Tapered end 24 guides tool 10 within the upper end of casing 14.

Milling tool 10 has a central bore 26 therein which is adapted to receive drilling fluid pumped from the surface for discharge from the end of tool 10 at 28. The discharged drilling fluid removes the metal cuttings, chips, shavings, or metal scrap material resulting from the cutting operation from the annulus 30 outside milling tool 10. A relatively small clearance, such as around 1/16th inch, is provided between stabilizer ribs 22 of tool 10 and the inner periphery of inner casing 14 so that a minimum lateral movement of tool 10 is provided upon rotation thereof.

Figure 2:
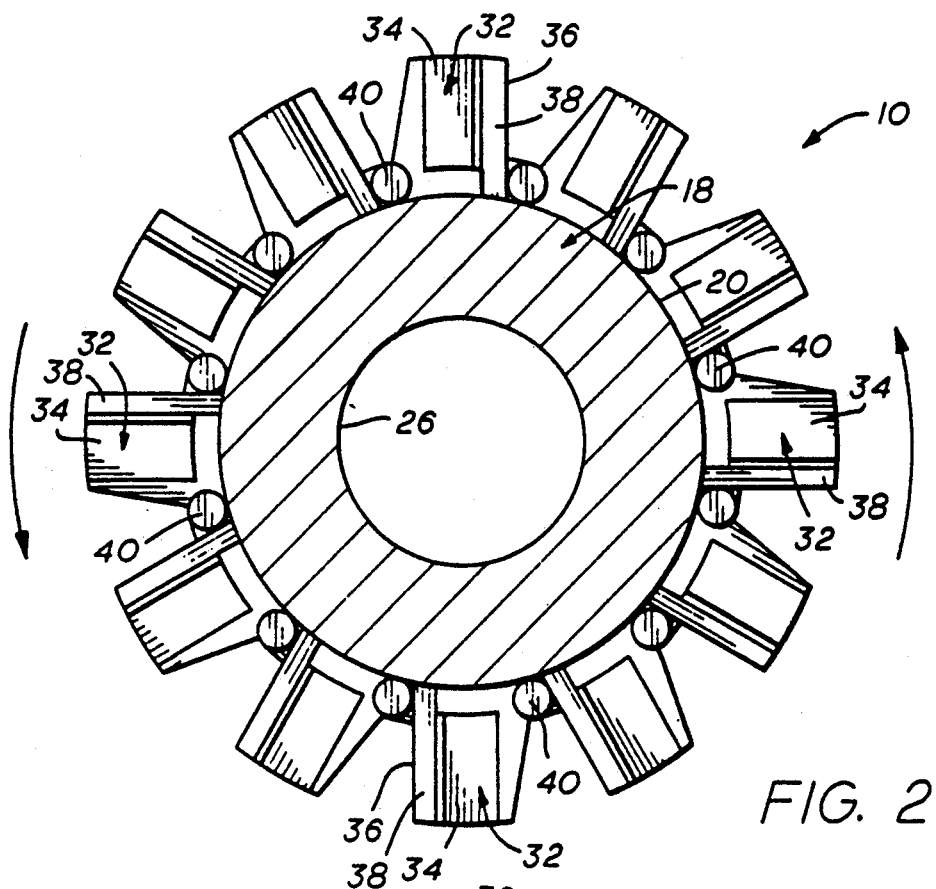
FIG. 2 is a section taken generally along the line 2—2 of FIG. 1 and showing the arrangement of the cutting blades about the cylindrical body of the milling tool shown in FIG. 1.
Figure 3:
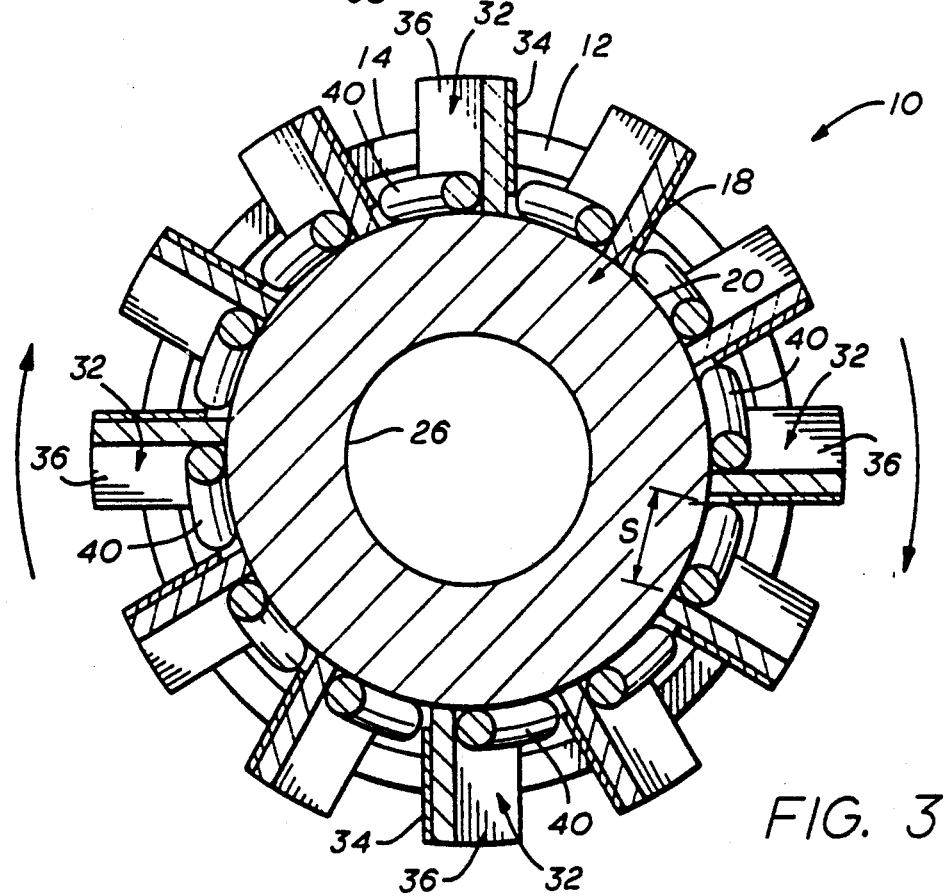
FIG. 3 is a section taken generally along line 3—3 of FIG. 1 and showing the improved cutting blades of the milling tool.

An important feature of the present invention is the improved blade design which is designed to provide a maximum cutting action with minimal loading and minimal frictional contact between the blades and the upper annular end 12 of inner casing 14 which is to be cut away and removed. The blade design of this invention comprises a plurality of generally identical straight elongate blades indicated at 32 and utilizing as many blades as can be feasibly positioned about outer periphery 20 of cylindrical body 18 while providing adequate spacing for an effective removal of the metal cuttings or turnings from annulus 30 by drilling fluid. A spacing S as shown in FIG. 3 between blades 32 along periphery 20 of at least around one inch is believed necessary in order to provide adequate space to remove satisfactorily the metal cuttings and scrap material, and preferably a spacing S of around two inches. Such a spacing S may be as much as around three inches under some operating conditions and provide effective results. Thus, a spacing S between blades 32 at peripheral surface 20 of between one inch and three inches provides best results. For example, for a milling tool 10 utilized for removal of casing 14 having an OD of nine and 5/8ths inches, the use of twelve blades 32 arranged at thirty degrees (30°) to each other about surface 20 has been found to obtain best results. It is noted that FIGS. 2-4 show tool 10 with twelve blades 32 thereon, while FIG. 1, for purposes of illustration, has only three blades illustrated with the remaining blades omitted. It is to be understood, however, that tool 10 of FIG. 1 would have twelve blades 32 thereabout.

Each blade 32 has between opposite sides thereof a leading planar face or surface 34, an opposed trailing planar face or surface 36, and a lower cutting and wear surface 38 positioned between and at right angles between surfaces 34 and 36 prior to use of blades 32. Lower surface 38 is in contact with and rides along the upper annular end 12 of inner casing 14 which is being cut and removed during the cutting operation. For securing the inner side of blades 32 to the outer peripheral surface 20, a suitable backup or support rod indicated at 40 is positioned at the juncture of trailing surface 36 with peripheral surface 20, and welded in position as shown in FIG. 2 with the elongate blades 32 extending at an angle A shown in FIG. 1 with respect to the vertical rotational axis of milling tool 10 and providing a negative axial rake which is an optimum of five degrees (5°), for example. An optimum range for angle A is between around three degrees (3°) and fifteen degrees (15°), but it is believed that under certain conditions angle A between around two degrees (2°) and twenty degrees (20°) would function satisfactorily.

Thus, as a result of the angularity of each blade 32, leading face 34 is inclined or slanted rearwardly from its upper end to its lower end in respect to the axis of rotation and this provides a negative rake shown by angle B to the cutting edge 39 of lower surface 38 thereby to permit cutting edge 39 to be pulled across and along end surface 12 in cutting relation for providing a highly effective smooth cutting action. Further, as a result of each straight blade 32 being mounted on cylindrical body 18 in an angled relation with respect to the longitudinal axis of body 18 as shown particularly in FIG. 1, leading face 34 has a radial rake which will vary from a minimum positive radial rake at the lower end of blade 32, to a 0° radial rake at the location where face 34 intersects the longitudinal axis of body 18, and to a maximum negative radial rake at the upper end of blade 32. It is noted that prior to any wear of blades 32, lower surface 38 is perpendicular to leading face 34 and angle B shown in FIG. 1 is the same as angle A. However, a horizontal wear flat surface is formed after use of blades 32 as shown in FIG. 6.

Leading face 34 is defined by a plurality of hard carbide cutting elements preferably comprising a plurality of cylindrical carbide discs or buttons 42 secured by suitable brazing or the like to the planar face of base 43 of blade 32. Discs 42 are preferably arranged in horizontal staggered rows of four and five discs and in a plurality of generally vertically extending staggered columns as illustrated generally in FIG. 5. A disc 42 which has been found to function in a satisfactory manner has a thickness of 3/16ths inch, a diameter of 3/8ths inch, and is sold under the name Sandvik S6 by The Sandvik Company, located in Houston, Tex. Each cylindrical disc 42 has a front face 42A which forms a portion of the surface area of leading face 34, an opposed rear face 42B flush with base 43, a front outer cutting edge 42C about front face 42A forming cutting edge 39 of lower surface 38 that bites or digs into the upper annular surface 12 of casing 14 as shown in FIG. 6 and annular surface or face 42D about disc 42 between faces 42A and 42B. Front faces 42A of discs 42 extend in a plane which defines leading face 34 and at angle A with respect to the axis of rotation thereby to provide a negative axial rake for face 42D forming cutting edge 39. Front face 42A may be provided, if desired, with a depressed area or recess therein receiving metal turning or chip 44 to aid in breakage of the chip 44 thereby to form a chip breaker. When the cutting operation is commenced with an unused blade 32, lower surface 38 which is formed by the lowermost portion of surface 42D and the lower edge portion 47 of blade 32 is at right angles to face 34 and at an angle B as shown in FIG. 1 with respect to the annular end surface 12 of casing 14.

However, after initial wear of the lowermost row of discs 42, lower surface 38 becomes a flat horizontal surface as shown in FIG. 6 formed by the horizontal wear flat surface on lower edge portion 47 of blade base 43 and the lowermost horizontal portion of surface 42D. After the initial horizontal wear flat surface 38 is formed as shown in FIG. 5 by the lowermost row of discs 42 and base 43, successive wear along the length of blades 32 is along a horizontal plane as shown in FIG. 6. Thus, the cutting surfaces formed by discs 42 are the cutting edge 42C and the portions of faces 42A and 42D immediately adjacent cutting edge 42C.

It has been found that a suitable depth of cut or bite taken from end surface 12 as shown at D in FIG. 6 is around 0.004 inch. With the depth of cut or bite taken by blade 32 of around 0.004 inch as shown in FIG. 6, and with a smooth rotational action metal turnings 44 have been found to have a generally short length between around three and five inches. Under some conditions, it may be desirable to utilize a chip breaker such as provided by a depression in face 42C of discs 42, to aid in the breaking away of relatively short chips 44 thereby to permit easy removal of the scrap material formed by metal turnings 44 from the well by drilling fluid. As previously noted, oftentimes the limiting factor in the rate of penetration is the rate of removal of the metal scrap material and it is important to have a metal turning 44 of a short length so that it does not curl and intermesh with other turnings to form a large mass of scrap material. By forming a turning 44 having a thickness between 0.002 inch and 0.005 inch in thickness and a length between three and five inches, at least for a substantial majority of all scrap metal material, a highly effective removal of the metal cuttings is obtained with a corresponding high rate of penetration for milling tool 10.

In order for blade 32 to provide a sufficient support for the carbide discs 42, it has been found that base 43 should have an optimum thickness T1 as indicated in FIG. 6 twice the thickness T2 of disc 42 in order to provide adequate strength and yet not exert a relatively large drag to the cutting operation. A thickness T1 between one and three times thickness T2 has been found to function satisfactorily. The thickness T1 of blade base 43 may be, for example, around 3/8ths of an inch when the thickness T2 of discs 42 is 3/16ths of an inch on a ratio of two to one. Further, in order to reduce any drag resulting from base 43 moving along end surface 12, the material from which base 43 is formed is of a mild steel having a Brinell hardness range of around 145 with an optimum Brinell hardness range of around 130 and 160. The carbide discs 42 have a Rockwell A hardness of around eighty-five to eighty-eight which is around seven to nine times harder than the material from which blade 32 is formed. For satisfactory results, it is believed that discs 32 should be at least around four times harder than base 43.

Casing 14 has a Brinnell hardness of around two hundred and carbide discs 42 are around five times harder than casing 14. As a result of base 43 being formed of a material several times as soft as carbide discs 42, the wear flat surface at 47 is easily worn away with a minimum of friction thereby providing a minimum of heat and a minimum torque required for rotation of milling tool 10, as is desirable.

The depth of cut D shown in FIG. 6 is selected in order to obtain a maximum rate of penetration with a large number of blades with each blade obtaining the same cutting depth or bite D. Further, it is desirable to obtain a relatively short metal shaving or cutting 44 which does not tend to intertwine with other shavings and provide an internesting mass which might restrict the removal of such metal scrap. The inclination of face 42A in contact with the metal turnings 44, particularly if formed with a depression therein, assists in the breaking of metal turnings 44 at a relatively short length of three to five inches, for example, and since a substantial thickness of shavings 44 is provided, the curling or turning up of the ends of the shavings is restricted.

The rotational speed of milling tool 10 is designed to provide a surface speed of blades 32 along the upper annular surface 12 of casing 14 at an optimum of around three hundred (300) to three hundred and fifty (350) feet per minute in order to obtain an optimum cutting depth for each blade of around 0.004 inch. When operating at such a speed, a torque of around 2500 to 3000 foot pounds has been found to be satisfactory for rotation of milling tool 10. A surface speed of between two hundred (200) and four hundred and fifty (450) feet per minute along surface 12 is believed to operate satisfactorily under certain conditions.

As previously noted, when utilizing blades 32 comprising the present invention in the manner set forth above, a penetration rate of from thirty to forty-five feet per hour has been obtained which is three or four times greater than the rate of penetration heretofore. This has been attained by the use of the novel blade design for milling tool 10 as shown and described utilizing a large number of blades 32 closely spaced between one and three inches from each other, each blade 32 taking a substantially large bite or depth of cut D between 0.002 inch and 0.005 inch from a negative rake on a hard carbide disc, and with minimal drag and friction resulting from the horizontal wear flat surface on the blades, a smooth rotation of milling tool 10 is obtained with a maximum rate of penetration. Blades 42 are worn away progressively with each row of discs 42 being successively worn away in a continuous cutting operation. For a blade around twelve inches in length, a casing section or length around two hundred (200) feet may be cut. Thus, milling tool 10 would not be required to be removed from the well for replacement of blades 32 until the removal of around two hundred (200) feet of casing 14, for example. The blade design of the present invention cuts away a length of casing around fifteen to twenty feet in length upon each inch of wear on blade 32.

As a specific example, for milling the end of an N-80 grade of casing 14 having a weight of forty-seven (47) pounds per foot, an OD of nine and 5/8ths inches, and utilizing a milling tool 10 having twelve blades 32 of the present invention arranged at thirty degrees (30°) to each other, a depth of eighty-eight feet in three hours for a penetration rate of around thirty feet per hour was obtained at a rotational speed of milling tool 10 one hundred and seventy revolutions per minute (170 RPMs) and a weight applied of around twelve thousand pounds.

From the above, it is apparent that milling tool 10 comprising the present invention and utilizing an improved blade design has been provided which increases the rate of penetration or rate of cutting away a section of casing within an existing well to an amount that is three or four times greater than heretofore. By providing a milling tool with such an improved blade design which results in an effective and fast removal rate of the metal scrap material from the well under the operational characteristics set forth, a highly improved result has been obtained.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. An oil field cutting tool adapted to be positioned and rotated downhole in a well bore for cutting metal casing previously positioned in the well bore, said tool comprising:

a tool body adapted to be disposed at least in part within the metal casing to be cut during the cutting operation, and adapted to be detachably secured at its upper end to means for rotating the tool;

an improved cutting structure on the tool body comprising:

a plurality of blades on the tool body at spaced intervals around the outer periphery thereof, each blade presenting a face extending outwardly from the tool body with respect to the longitudinal axis of rotation of the tool body, said face constituting a leading face of the blade with respect to the direction of the tool body; and a plurality of cutting elements of hard, wear-resistant material of predetermined size and shape arranged and mounted on the leading face of the blades in a predetermined pattern, each cutting element having a generally planar front cutting face, an opposed back face secured to the leading face of the respective blade, and a peripheral surface extending from the back face to the front face defining a sharp cutting edge extending around the front face of said cutting element, the front cutting face and sharp cutting edge adapted to be engageable with the metal casing to be cut;

said cutting elements in said predetermined pattern being arranged on the respective blade in closely spaced side-by-side relationship in a plurality of predetermined rows extending in a direction generally outwardly from the longitudinal axis of rotation of the tool body, and in a plurality of predetermined columns extending in a direction generally along the longitudinal axis of rotation of the tool body, with each row and each column having at least two cutting elements therein, whereby the cutting elements of the bottom row of cutting elements on each blade are engageable with the metal casing to be cut and present a generally continuous bottom cutting edge across the width of said row.

2. An oil field tool as set forth in claim 1 wherein the leading faces of said blades extend generally radially outwardly from said tool body with respect to its axis of rotation.

3. An oil field as set forth in claim 1 wherein the rows of cutting elements extend in a generally horizontal direction.

4. An oil field tool as set forth in claim 1 wherein the columns of cutting elements extend in a generally vertical direction.

5. An oil field tool as set forth in claim 1 wherein the back faces of said cutting elements are generally planar.

6. An oil field tool as set forth in claim 1 wherein said cutting elements are of essentially the same size.

7. An oil field tool as set forth in claim 1 wherein said cutting elements are of essentially the same shape.

8. An oil field tool as set forth in claim 1 wherein said hard cutting material is a carbide alloy.

9. An oil field tool as set forth in claim 1 wherein each of said rows of cutting elements is of a width greater than the thickness of the metal casing to be cut.

10. An oil field tool as set forth in claim 1 wherein the cutting elements of each row are offset and in lapping relationship with the cutting elements of the row immediately adjacent thereto on the respective blades.

11. An oil field tool as set forth in claim 1 wherein the front face of each cutting element is inclined relative to the longitudinal axis of rotation of the tool body to provide the cutting elements with a negative rake angled at its areas of engagement with the metal casing to be cut.

12. An oil field tool as set forth in claim 1 wherein the leading faces of the blades are axially inclined relative to the longitudinal axis of rotation of the tool body.

13. An oil field tool as set forth in claim 1 wherein said blades are of metal plate construction.

14. An oil field tool as set forth in claim 1 wherein said cutting elements are mounted on their respective blades by brazing.

15. An oil field tool as set forth in claim 1 wherein said cutting elements on the respective blades are in side-by-side engagement at their peripheral surfaces.

16. An oil field tool as set forth in claim 1 wherein the hard cutting material of the cutting elements has a hardness at least three times greater than that of the metal casing to be cut.

17. An oil field tool as set forth in claim 1 wherein the hard cutting material of the cutting elements has a hardness greater than that of the blades.

18. An oil field tool as set forth in claim 1 wherein each column comprises at least three of said cutting elements.

19. An oil field tool as set forth in claim 1 wherein the leading face of said blades is generally planar.

20. An oil field tool as set forth in claim 1 wherein said tool body is generally cylindrical.

21. An oil field tool as set forth in claim 1 wherein the blades and tool body are separate members, with the blades being mounted on the tool body.

22. An oil field tool as set forth in claim 21 wherein the blades are fixedly secured to the tool body.

23. An oil field tool as set forth in claim 1 wherein each row comprises at least three of said cutting elements.

24. A plurality of improved blades for positioning at predetermined space locations on the body of a cutting tool adapted to be rotated and bear down on the upper end of a metal tubular member held in stationary position downhole and for extending outwardly from the body for cutting away the metal tubular member downhole in a well bore;

each of said improved blades having a base with a front generally planar leading surface and a rear generally planar trailing surface extending between opposed generally parallel sides of the blade and between opposed ends of the blade;

a plurality of cutting elements of a predetermined size and shape secured in a predetermined generally symmetrical pattern to said leading surface of said base, each of said cutting elements having an exposed front cutting face, an opposed rear face secured to the leading surface of said base, and a peripheral surface extending between said faces defining a relatively sharp cutting edge at the juncture of the peripheral surface and front face;

said cutting elements comprising cylindrical discs positioned in closely spaced side-by-side relation to each other on the leading surface of each blade in a plurality of closely spaced parallel rows extending transversely between the sides of the blade and in a plurality of closely spaced parallel columns extending generally longitudinally between the ends of the blade with the front faces and associated cutting edges of the cutting elements adjacent one end of the blades defining a lower generally continuous cutting surface which is adapted upon mounting of the blades on the tool body and rotation and engagement of the cutting tool with the tubular member in a cutting operation for biting into the upper end of the metal tubular member for removing metal turnings from said upper end, said cutting elements for each blade being of a similar size and shape with the cutting elements of each row being offset and in lapping relation with the cutting elements of the row immediately adjacent thereto on the respective blade.

25. In a cutting tool for cutting a previously installed metal well casing at an open upper end thereof and comprising a body having a lower portion adapted to be received within said casing; the improvement comprising:

a plurality of blades on the body at spaced intervals about the body and extending outwardly therefrom, each of said blades having a base with a leading surface relative to the direction of rotation, a plurality of cutting elements secured in a predetermined pattern to said leading surface of said base, each of said cutting elements having an exposed front face, a rear face secured to the leading surface of said base, and a peripheral surface extending between said faces defining a relatively sharp cutting edge at the juncture of the peripheral surface and front face;

said cutting elements being of a predetermined size and shape arranged in closely spaced side by side relation to each other on the leading surface of each blade with the front faces and associated cutting edges of the lowermost cutting elements defining a lower generally continuous cutting surface which is progressively worn away during the cutting operation, the cutting surface formed by the front faces of the cutting elements between around two degrees and twenty degrees with respect to the rotational axis of the cutting tool and presenting a negative radial rake with respect to the longitudinal axis of the cutting tool during the cutting operation;

the lowermost cutting elements forming a lower cutting surface biting into said end surface of the casing in a cutting action to remove metal turnings from said end surface upon rotation of the cutting tool, the lowermost cutting elements and adjacent base being worn away along a generally horizontal plane as the cutting operation continues with the next successive cutting elements then engaging the upper end of the casing in a continuous cutting action.

26. In a cutting tool as set forth in claim 25;
each of said blades being elongate and having a planar leading surface inclined rearwardly from its upper end between around two degrees (2°) and twenty degrees (20°) with respect to the axis of rotation of said tool.

27. In a cutting tool as set forth in claim 25;
said cutting elements having a hardness of at least four times the hardness of said base on which the cutting elements are mounted.

28. In a cutting tool for cutting a metal tubular member held in stationary position downhole in a well bore, said tool having a generally cylindrical body adapted to be positioned adjacent the upper end of the tubular member and to be rotated within the bore hole about the longitudinal axis of the body; the improvement comprising:

a plurality of blades mounted at spaced intervals on the body and extending outwardly therefrom, each of said blades having a base with a leading surface relative to the direction of rotation;

a plurality of cutting elements of a predetermined shape and size secured to said leading surface of said base in a predetermined generally symmetrical pattern, each of said cutting elements having an exposed front face, a rear face secured to the leading surface of said base, and a peripheral surface extending between said faces defining a relatively sharp cutting edge at the juncture of the peripheral surface and front face;

said cutting elements being positioned on the leading surface of each blade in a plurality of closely spaced parallel rows, the lowermost cutting elements forming a lower cutting surface for biting into said upper end of the tubular member in a cutting action to remove metal turnings from said upper end upon rotation of the cutting tool; and the exposed front face of each cutting element being arranged and constructed for directing an extending end portion of a metal turning cut from the upper end of the tubular member in such a manner to effect a breaking of the metal turning from the tubular member thereby to form a chip breaker.

29. In a cutting tool as set forth in claim 28 wherein the front face of each cutting element has a negative axial rake angle relative to the longitudinal axis of said body of an amount sufficient to effect a breaking of the metal turning of a relatively small length from the upper end of the tubular member.

30. For use on a cutting tool for cutting away from a metal tubular member held in stationary position downhole in a well bore by rotating the tool while bearing down on the upper end of the tubular member;

the improvement comprising:

a plurality of generally elongate blades for mounting on the tool body at spaced predetermined locations thereon and for extending outwardly from the body, each of said blades having a base with a front generally planar surface constituting a leading surface with respect to the direction of rotation of the tool and a rear surface constituting a trailing surface with respect to the direction of rotation of the tool extending between opposed generally parallel opposed sides of the blade and between opposed ends of the blade;

a plurality of cutting elements of a predetermined size and shape secured in a predetermined generally symmetrical pattern to said leading surface of said base, each of said cutting elements having an exposed front cutting face, an opposed rear face secured to the leading surface of said base, and a peripheral surface extending between said faces defining a relatively sharp cutting edge at the juncture of the peripheral surface and front face;

said cutting elements being positioned in closely spaced side-by-side relation to each other on the leading surface of each blade in a plurality of closely spaced parallel rows extending transversely between the sides of the blade and in a plurality of closely spaced parallel columns extending generally longitudinally between the ends of the blade with the front faces and associated cutting edges of the cutting elements adjacent one end of the blades defining a lower generally continuous cutting surface which is adapted upon mounting of the blades on the tool body and rotation and engagement of the cutting tool with the tubular member for biting into the upper end of the metal tubular member for removing metal turnings from said upper end.

31. The improvement as set forth in claim 30 wherein said cutting elements for each blade are of a similar size and shape with the butting elements of each row being offset and in lapping relationship with the cutting elements of the row immediately adjacent thereto on the respective blade.

32. A plurality of improved blades for positioning at predetermined spaced locations on the body of a cutting tool adapted to be rotated and bear down on the upper end of a metal tubular member held in stationary position downhole and for extending outwardly from the body for cutting away the metal tubular member downhole in a well bore;

each of said improved blades having a base with a front generally planar leading surface and a rear generally planar trailing surface extending between opposed generally parallel sides of the blade and between opposed ends of the blade;

a plurality of cutting elements of a predetermined size and shape secured in a predetermined generally symmetrical pattern to said leading surface of said base, each of said cutting elements having an exposed front cutting face, an opposed rear face secured to the leading surface of said base, and a peripheral surface extending between said faces defining a relatively sharp cutting edge at the juncture of the peripheral surface and front face;

said cutting elements being positioned in closely spaced side-by-side relation to each other on the leading surface of each blade in a plurality of closely spaced parallel rows extending transversely between the sides of the blade and in a plurality of closely spaced parallel columns extending generally longitudinally between the ends of the blade with the front faces and associated cutting edges of the cutting elements adjacent one end of the blades defining a lower generally continuous cutting surface which is adapted upon mounting of the blades on the tool body and rotation and engagement of the cutting tool with the tubular member in a cutting operation for biting into the upper end of the metal tubular member for removing metal turnings from said upper end, said cutting elements for each blade being of a similar size and shape with the cutting elements of each row being offset and in lapping relation with the cutting elements of the row immediately adjacent thereto on the respective blade.

33. The improved blades as set forth in claim 32 wherein the exposed front cutting face of each cutting element is arranged and constructed for directing an extending end portion of a metal turning cut from the end of the tubular member in such a manner as to effect a breaking of the metal material from the tubular member when the blades are utilized in a cutting operation thereby to form a chip breaker.

34. An oil field cutting tool adapted to be positioned and rotated downhole in a well bore for cutting metal casing previously positioned well bore, said tool comprising:

a tool body adapted to be disposed at least in part within the metal casing to be cut during the cutting operation, and adapted to be detachably secured at its upper end to means for rotating the tool;

an improved cutting structure on the tool body comprising:

a plurality of blades on the tool body at spaced intervals around the outer periphery thereof, each blade presenting a face extending outwardly from the tool body with respect to the longitudinal axis of rotation of the tool body, said face constituting a leading face of the blade with respect to the direction of the tool body; and a plurality of cutting elements of hard, wear-resistant material of predetermined size and shape arranged and mounted on the leading face of the blades in a predetermined pattern, each cutting element having a generally planar front cutting face, an opposed back face secured to the leading face of the respective blade, and a peripheral surface extending from the back face to the front face defining a sharp cutting edge extending around the front face of said cutting element, the front cutting face and sharp cutting edge adapted to be engageable with the metal casing to be cut;

said cutting elements in said predetermined pattern being of a generally cylindrical shape arranged on the respective blade in closely spaced side-by-side relationship in a plurality of predetermined rows extending in a direction generally outwardly from the longitudinal axis of rotation of the tool body, and in a plurality of predetermined columns extending in a direction generally along the longitudinal axis of rotation of the tool body, with each row and each column having at least two cutting elements therein, whereby the cutting elements of the bottom row of cutting elements on each blade are engageable with the metal casing to be cut and present a generally continuous bottom cutting edge across the width of said row.

35. In a cutting tool for cutting a previously installed metal well casing at an open upper end thereof and comprising a body having a lower portion adapted to be received within said casing; the improvements comprising:

a plurality of blades on the body at spaced intervals about the body and extending outwardly therefrom, each of said blades having a base with a leading surface relative to the direction of rotation, a plurality of cutting elements secured in a predetermined pattern to said leading surface of said base, each of said cutting elements having an exposed front face, a rear face secured to the leading surface of said base, and a peripheral surface extending between said faces defining a relatively sharp cutting edge at the juncture of the peripheral surface and front face;

said cutting elements being of a predetermined size and shape arranged in closely spaced side-by-side relation to each other on the leading surface of each blade with the front faces and associated cutting edges of the lowermost cutting elements defining a lower generally continuous cutting surface which is progressively worn away during the cutting operation, the cutting surface formed by the front faces of the cutting elements being between around two degrees and twenty degrees with respect to the rotational axis of the cutting tool and representing a negative radial rake with respect to the longitudinal axis of the cutting tool during the cutting operation;

the lowermost cutting elements forming a lower cutting surface biting into said end surface of the casing in a cutting action to remove metal turnings from said end surface upon rotation of the cutting tool, the lowermost cutting elements and adjacent base being worn away along a generally horizontal plane as the cutting operation continues with the next successive cutting elements then applying the upper end of the casing in a continuous cutting action;

said cutting elements comprising generally cylindrical discs of hard cutting material arranged in a plurality of generally horizontal rows on the associated blades.

36. In a cutting tool as set forth in claim 35;

said cylindrical discs being generally uniform in size and shape and arranged in staggered horizontal rows with the cylindrical discs in each row being in a lapping relationship with the cylindrical discs of adjacent rows.

* * * * *

UNITED STATES PATENT AND TRADEMARK OFFICE
CERTIFICATE OF CORRECTION

PATENT NO. : 5,014,778

DATED : May 14, 1991

INVENTOR(S) : Gerald D. Lynde, Kenneth W. Winterrowd, Harold H. Harvey, Jr.

It is certified that error appears in the above-identified patent and that said Letters Patent is hereby corrected as shown below:

Column 5, line 53, "opposite" should be -- opposed --.

Column 9, line 52, after "field" insert -- tool --.

Column 10, line 9, "angled" should be -- angle --.

Column 10, line 45, "space" should be -- spaced --.

Column 16, line 1, "applying" should be -- engaging --.

Signed and Sealed this

Eighth Day of September, 1992

Attest:

DOUGLAS B. COMER

*Attesting Officer*    *Acting Commissioner of Patents and Trademarks*